United States Patent [19]

Hoster

[11] 4,370,089

[45] Jan. 25, 1983

[54] HOISTS

[76] Inventor: Clyde H. Hoster, 12-14 Austin St., Newstead, Queensland 4006, Australia

[21] Appl. No.: 181,700

[22] Filed: Aug. 27, 1980

[51] Int. Cl.[3] .................... B65G 7/08

[52] U.S. Cl. .................... 414/589

[58] Field of Search .................... 414/589, 590; 271/147, 271/157, 160

[56] References Cited

U.S. PATENT DOCUMENTS

| | | | |
|---|---|---|---|
| 2,969,220 | 1/1961 | Spencer | 414/590 X |
| 3,179,548 | 4/1965 | Debray | 271/160 UX |
| 3,185,318 | 5/1965 | Lewis | 414/590 |

*Primary Examiner*—Richard A. Schacher

*Attorney, Agent, or Firm*—D. Paul Weaver

[57] ABSTRACT

This invention relates to a hoist suitable for elevation or lowering of articles such as vehicle transmissions. The hoist includes a support member, a frame and an actuating cable anchored to the frame. There is also provided control means for controlling movement of the cable. The actuating cable operably engages with the support member so as to cause elevation of lowering thereof.

9 Claims, 3 Drawing Figures

HOISTS

BACKGROUND OF THE INVENTION

This invention relates to a hoist suitable for elevation or lowering of articles.

Hereinafter the invention will be described in relation to the elevation and lowering of vehicle transmissions such as automatic transmissions and other relatively heavy vehicle components such as engine blocks. However, it will be appreciated that this is not the sole application of the invention and therefore it should not be limited to this example application.

Hitherto in relation to the repair or installation of heavy vehicle components such as automatic transmissions, these components have been relatively difficult to utilize when the vehicle has been elevated on a conventional vehicle hoist which is operated by hydraulic pumps. This has been mainly due to the heavy weight of an automatic transmission housing and the fact that it required more than one man to lift it for installation into the elevated vehicle.

SUMMARY OF THE INVENTION

It is therefore an object of the invention to provide a hoist which is capable of alleviating the above-mentioned problem.

It is a further object of the invention to provide a hoist which is simple in concept and therefore relatively inexpensive to produce while also being efficient in operation.

The hoist of the invention includes a support member; a frame, an actuating cable anchored to the frame; and control means for controlling movement of the cable, said actuating cable operably engaging with the support member so as to cause elevation or lowering thereof.

Reference is now made to a preferred embodiment of the invention as shown in the attached drawings, wherein:

DESCRIPTION OF THE PREFERRED EMBODIMENTS

Figure 1:
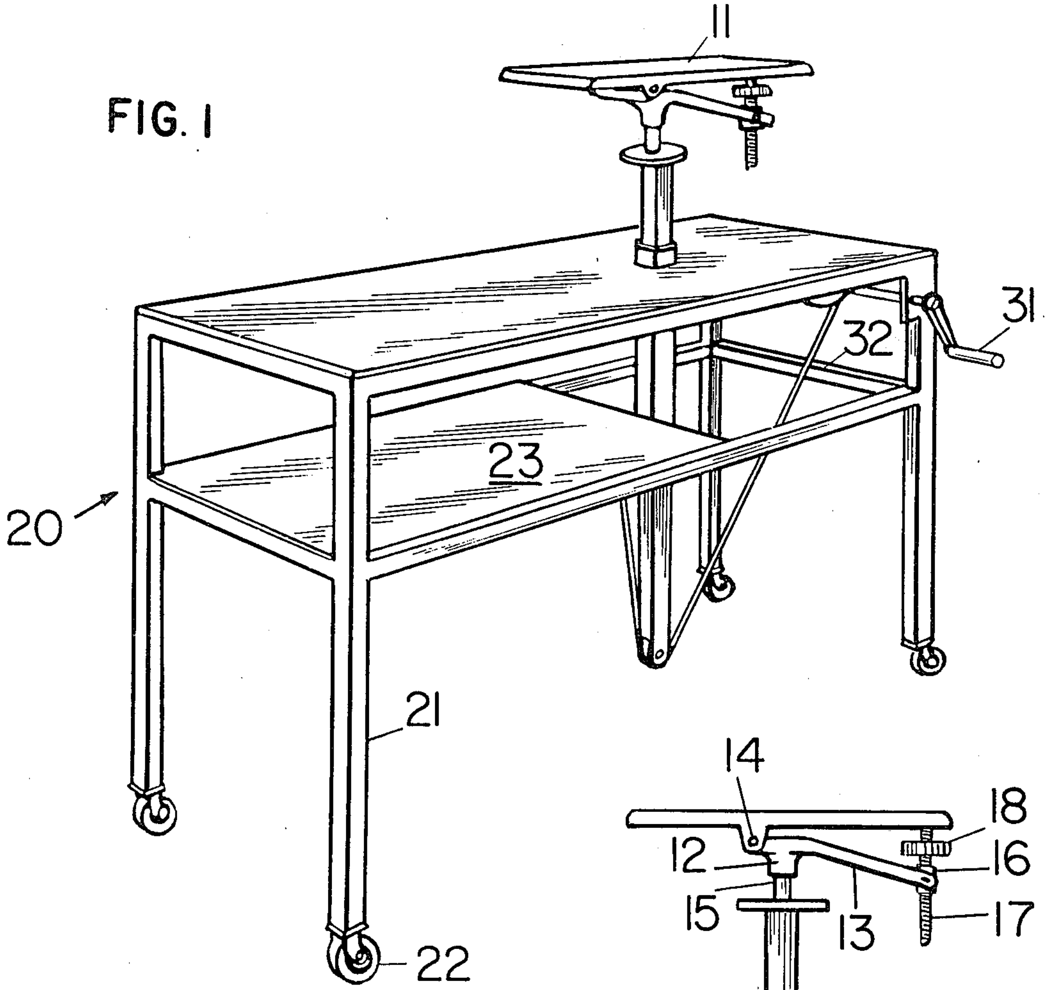
FIG. 1 is a perspective view of a hoist constructed in accordance with the invention.

In the drawings, the support member is preferably in the form of an upright shaft 10 which is integral with or otherwise secured to the upper plate member 11. Desirably however the plate 11 is pivotally secured to the upright shaft 10. In one form the plate 11 may be hingedly secured to the upper end of the upright shaft by a hinge member 12 which may have an elongate lateral extension 13. Hinge member 12 is pivotally attached to depending lugs 14 of plate 11. The plate 11 may therefore be pivoted about a horizontal axis relative to the upright shaft 10. Desirably the pivotal interconnection between the plate 11 and the upright shaft 10 is such that the plate 11 may be retained in any desired orientation with the upright shaft 10. It is also preferred that the height of the plate 11 may be adjustable as required. Thus the plate 11 may be mounted on a depending stem 15 which is screw threadedly engageable with the shaft 10. It also will be appreciated that the plate 11 may only be pivoted relative to the upright shaft 10 only to a relatively limited extent. Hence lateral extension 13 is mounted to sleeve 16 which is screw threadedly engaged with depending rod 17 having a limit stop 18.

The plate 11 may have any appropriate configuration but is suitably rectangular with the stem 15 connected to the central region of the plate 11.

The upright shaft 10 suitably has guide means assoaiated therewith and in one form this may be a guide tube 19 with the shaft passing through the bore of the guide 8tube 19. Suitably the guide tube 19 is mounted on a frame. The frame is preferably in the form of a table 20 having four legs 21 with castors 22 attached to the undersurface of each leg so as to provide a travelling frame.

With regard to the frame it is desirably provided with a shelf 23 underneath the table which is supported by all four legs. The guide tube 19 may be attached to the frame between the top surface of the table 20 and the shelf 23, and intermediate the central region of the table and one shorter edge when the table is rectangular.

Figure 2:
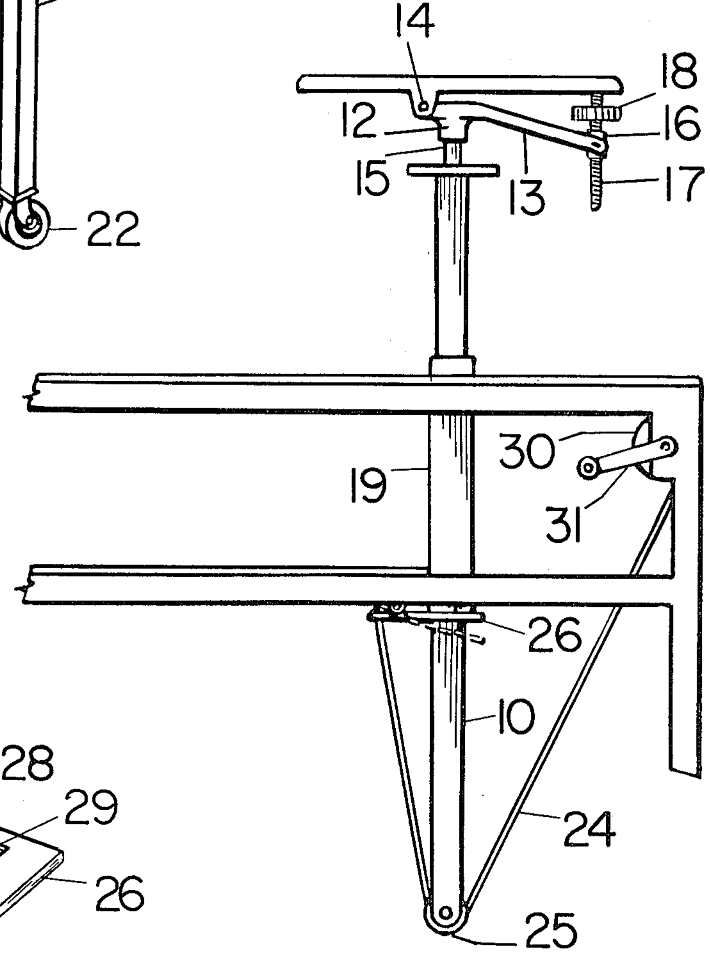
FIG. 2 is a side view of the hoist shown in FIG. 1.
Figure 3:
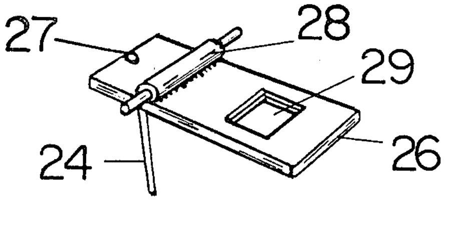
FIG. 3 is a detailed view of locking means so as to lock movement of the support member in position if the actuating cable is sheared.

The actuating cable 24 desirably engages with the under-surface of the upright shaft 10 and to reduce friction the upright shaft has attached to its undersurface a pulley 25 which engages the cable. The cable 24 is anchored at one end and this may be to an appropriate location on the frame adjacent the guide tube. Preferably the cable 24 is anchored to the undersurface of the shelf. Preferably however the cable 24 is anchored to one end of a lower plate 26 at 27 as shown in FIG. 3. The plate 27 is desirably pivotally attached to the underside of shelf 23 by pivot joint 28 and also has an aperture 29 through which passes shaft 10. As shown in dotted outline in FIG. 2, if the cable 24 is sheared or snaps for some reason, plate 26 will pivot upwardly so as to contact shelf 23 and hence lock shaft 10 in position.

The control means for the cable is suitably in the form of a winch having a winch drum 30 on which the cable is wound. Suitably the winch drum may have a handle 31, attached thereto, for either winding up or unwinding of the cable. Suitably the winch drum 30 is attached to a horizontal rail 32 as shown.

There also may be provided retaining means for retaining the upright shaft at any desired height. Suitably this is in the form of a locking pin (not shown) which may be inserted through co-aligned holes (not shown) in the guide tube and the upright shaft.

The actuating cable may comprise any suitable cable cord or other appropriate line which can be selected for the particular purpose desired.

In operation of a preferred embodiment of the invention the upright shaft 10 and its associated plate 11 may be lowered or elevated by unwinding or winding up of the winch drum 30. During the unwinding operation the actuating cable 24 is caused to travel downwardly due to the end remote from the winch being anchored and this causes the shaft 10 to be lowered. During the winding up operation the actuating cable 24 is caused to move upwardly causing elevation of the upright shaft 10.

It will be appreciated that not only is the hoist of the invention exceedingly simple in construction but also is just as effective in operation as conventional hoists. Conventional hoists being hydraulically operated are more complex in construction and therefore are most costly to maintain.

I claim:

1. A hoist suitable for the elevation and lowering of vehicle transmissions comprising a support member, a frame, an actuating cable anchored to the frame, and control means for controlling movement of the cable, said actuating cable operably engaging the support member to cause elevating and lowering thereof, and the actuating cable being anchored to a lower plate which is pivotally attached to said frame so as to be tiltable about a horizontal axis, said lower plate having an aperture through which said support member passes, the lower plate normally assuming a horizontal position during use but tilting about said horizontal axis to engage said frame and thereby lock the support member in position if the actuating cable is parted.

2. A hoist assembly comprising a support frame, an upstanding hoist shaft supported by said frame for reciprocatory movement between raised and lowered positions, a stop assembly cooperating with said hoist shaft and supported for movement between a first position at which said stop assembly is released from the hoist shaft and a second position at which the stop assembly engages the hoist shaft and prevents lowering thereof, said stop assembly being biased toward said second position, a cable connected to said hoist shaft, actuating means for moving said cable to cause the hoist shaft to be selectively raised or lowered, and said cable being operatively connected to said stop assembly whereby tension in the cable resulting from operation of said actuating means to raise or lower the hoist shaft moves said stop assembly to said first position.

3. A hoist assembly as defined in claim 2, wherein said stop assembly is a member having spaced engagement faces arranged at opposite sides of the hoist shaft, said member being pivotally supported on the support frame for movement between said first position at which the engagement faces are separated from the opposite sides of the hoist shaft, and said second position at which the engagement faces engage the opposite sides of the hoist shaft to lock the hoist shaft.

4. A hoist assembly as defined in claim 3, wherein said member is biased by gravity to said second position.

5. A hoist assembly as defined in claim 4, wherein said cable is secured fixedly to the stop assembly to provide said connection thereto and passes from the stop assembly downwardly around guide means supported on the hoist shaft adjacent the lower end thereof and returns upwardly to said actuating means.

6. A hoist assembly as defined in claim 5, wherein said actuating means is a drum winch.

7. A hoist assembly as defined in claim 2, wherein said hoist shaft supports a pivoted plate at its upper end for movement about a horizontal pivot axis, and control means to secure the pivoted plate in selected pivotal positions.

8. A hoist assembly as defined in claim 7, wherein the control means includes a screw-threaded member arranged in end abutting relationship with the bottom of the pivoted plate and having threaded engagement with an extension fixed to the upper end of the hoist shaft.

9. A hoist assembly as defined in claim 8, wherein the support frame is a castered table and the pivoted plate is spaced above the top of said table.

* * * * *

UNITED STATES PATENT AND TRADEMARK OFFICE
CERTIFICATE OF CORRECTION

PATENT NO. : 4,370,089

DATED : January 25, 1983

INVENTOR(S) : Clyde H. Hosier

It is certified that error appears in the above-identified patent and that said Letters Patent is hereby corrected as shown below:

On the title page, /76/ Inventor: "Hoster" should read -- Hosier --.

Signed and Sealed this

*Third* Day of *May 1983*

[SEAL]

*Attest:*

GERALD J. MOSSINGHOFF

*Attesting Officer* *Commissioner of Patents and Trademarks*